(Model.)

E. MAYER.
COMBINED BANK LEDGER AND BALANCE BOOK.

No. 307,211. Patented Oct. 28, 1884.

WITNESSES:
A. W. Greene
A. V. Richards

INVENTOR
Esrom Mayer,
by Robt. H. Wiles
ATTORNEY

UNITED STATES PATENT OFFICE.

ESROM MAYER, OF FREEPORT, ILLINOIS.

COMBINED BANK LEDGER AND BALANCE-BOOK.

SPECIFICATION forming part of Letters Patent No. 307,211, dated October 28, 1884.

Application filed May 14, 1883. (Model.)

*To all whom it may concern:*

Be it known that I, ESROM MAYER, a resident of Freeport, in the county of Stephenson and State of Illinois, have invented certain new and useful Improvements in a Combined Bank Ledger and Balance-Book; and I do hereby declare the following to be a full, clear, and exact description of the invention, such as will enable others skilled in the art to which it pertains to make and use the same.

My invention relates to improvements in ledgers and balance-books of the class especially adapted to the needs of banks, its object being to provide a means for facilitating the carrying over of the balances from one page to another.

The invention is shown in the accompanying drawing and described and explained in the following specification.

In the drawing, which represents a double page of the ledger and balance-book, (the middle of the double leaf being cut away to save space,) the columns headed "1" "2" "31" are columns for posting the transactions of each day's business for a month, the column headed "1883, March," is for the titles of the different accounts, and the column headed "A" and partial column on the left marked "A'" are supplemental columns to be used in transferring from one page to another, as hereinafter set forth. The column for each day consists of a credit and a debit column ruled for dollars and cents, and at the end of each day's business the aggregate of the credits and debits of each account are posted from the journal to their appropriate columns in the ledger and balance-book. The balances are then computed and carried forward to the proper column for the ensuing day. Thus, in the account entitled "Bills discounted," at the top of the page, the debit balance at the beginning of business March 1 is $314,780. At the end of the day's business the aggregates of the debits and credits of the account are posted to the debit and credit columns, the amount being $10,500 debit and $8,500 credit. The balance is then computed, and the amount, $316,780 debit, is carried to the debit column for the next day, March 2. The same method is pursued to the end of the month, and on the last business day the balances are carried to the column A on the supplemental section of the leaf, at the extreme right hand of the page. It will be seen that the space for each day's business is divided by a horizontal line into two spaces, the one above the line being used for the balance brought forward from the preceding day, while the one below the line is used for the entries posted from the ledger. On the supplemental column A no items are to be posted, however, and the balance from the last day of the month is carried to the upper space, while the name of the account is written in the space below the line. The supplemental section is then cut or torn from the leaf, or merely folded over, and the balances and titles of the different accounts copied to the succeeding page. At the left side of the drawing is shown the supplemental section folded over from the preceding page, and the balances which appear on it are transferred to the column for March 1. I have found it best in practice to cut or tear off the supplemental section, because if folded over it covers the space intended for the names of the accounts on the succeeding page, and for convenience in detaching it a row of perforations, *m n*, separates it from the body of the sheet.

As shown in the drawing, an entire month is provided for on a double page. This makes the book so large, however, that many bankers prefer to insert between the two pages a short inset, the first full page and the first page of the inset affording space for dates from the first to the fifteenth of the month, while the second page of the inset and the second full page are ruled for the remainder of the month. Where such an inset is used, a supplemental section is provided at its outer edge, and is used exactly as above set forth, except that it is not necessary to transfer the names of accounts at the middle of the month, and therefore only the balances of the fifteenth are written on the supplemental column, and from it transferred to the column for the sixteenth.

It is evident that while the supplemental transfer-column is especially adapted to use in balance-books for bankers' use, it may be applied to any account-book or other sheet in which it is desired to copy a column of figures from one page to a succeeding one; and I do not therefore intend to limit my claim to its use in the particular book shown and described.

I believe that the general form of ruling shown in this book is new and useful; but I am informed that such ruling is not a proper subject for a patent, and I do not therefore at this time lay any claim thereto; but, Having described my invention, what I claim as new, and desire to secure by Letters Patent, is—

A balance-book having at the outer margin of each leaf a supplemental section adapted, substantially as described, to receive the balances from the last working column of the leaf and to be detached therefrom to facilitate the transfer of such balances to a succeeding page.

In testimony whereof I have signed this specification in the presence of two subscribing witnesses.

ESROM MAYER.

Witnesses:
R. H. WILES,
OSCAR TAYLOR.